United States Patent
Lee

(10) Patent No.: US 8,211,378 B2
(45) Date of Patent: Jul. 3, 2012

(54) REACTOR FOR SEPARATING ALUMINIUM FROM MULTI-LAYER FILM MATERIALS

(75) Inventor: Youngchul Lee, Seoul (KR)

(73) Assignee: Korea Institute of Industrial Technology, Cheonan-Si (KR)

(*) Notice: Subject to any disclaimer, the term of this patent is extended or adjusted under 35 U.S.C. 154(b) by 304 days.

(21) Appl. No.: 12/373,392

(22) PCT Filed: May 2, 2007

(86) PCT No.: PCT/KR2007/002148
§ 371 (c)(1),
(2), (4) Date: Jan. 12, 2009

(87) PCT Pub. No.: WO2008/136542
PCT Pub. Date: Nov. 13, 2008

(65) Prior Publication Data
US 2009/0304561 A1    Dec. 10, 2009

(51) Int. Cl.
*B01J 19/18* (2006.01)
*B01J 19/24* (2006.01)

(52) U.S. Cl. ...... 422/225; 422/227; 422/230; 422/184.1

(58) Field of Classification Search ............ 422/225, 422/227, 230, 181.1, 184.1
See application file for complete search history.

(56) References Cited

U.S. PATENT DOCUMENTS

| | | | |
|---|---|---|---|
| 2,031,939 A * | 2/1936 | Donlan | 208/267 |
| 3,939,248 A * | 2/1976 | Caldwell | 423/166 |
| 4,804,168 A | 2/1989 | Otsuka et al. | |
| 5,395,593 A * | 3/1995 | Martin | 422/128 |
| 5,523,474 A * | 6/1996 | Kingsley et al. | 562/416 |

FOREIGN PATENT DOCUMENTS

| | | |
|---|---|---|
| EP | 1683829 A1 | 7/2006 |
| JP | 63084622 A | 4/1988 |
| JP | 11267484 A | 10/1999 |
| KR | 100481426 B1 | 4/2005 |
| KR | 1020070097967 A | 10/2007 |

* cited by examiner

*Primary Examiner* — Walter D Griffin
*Assistant Examiner* — Lessanework Seifu
(74) *Attorney, Agent, or Firm* — Shook Hardy & Bacon LLP

(57) ABSTRACT

Disclosed is a reactor for separating an aluminum layer from multi-layer film wastes to reuse a multi-layer film waste without burying or incinerating the multi-layer film waste including the aluminum. The reactor comprises a cylindrical casing which is filled with a solution to dissolve aluminum layers of the multi-layer film wastes pulverized into a predetermined size, a partition dividing an inner portion of the casing into a reactor tub in which the solution reacts with the aluminum layer and a separator tub which is provided at a portion of the reactor tub to decompose the pulverized multi-layer film wastes in which the aluminum is completely dissolved by the solution, and a stirrer which is installed at an upper portion of the reactor and stirs the solution in the reactor to activate the reaction between the solution and the aluminum in the reactor tub and to transfer the multi-layer film wastes to the separator tub. The partition is spaced apart from a bottom of the casing to form a passage between the bottom of the casing and the partition, and the reactor tub communicates with the separator tub through the passage.

7 Claims, 4 Drawing Sheets

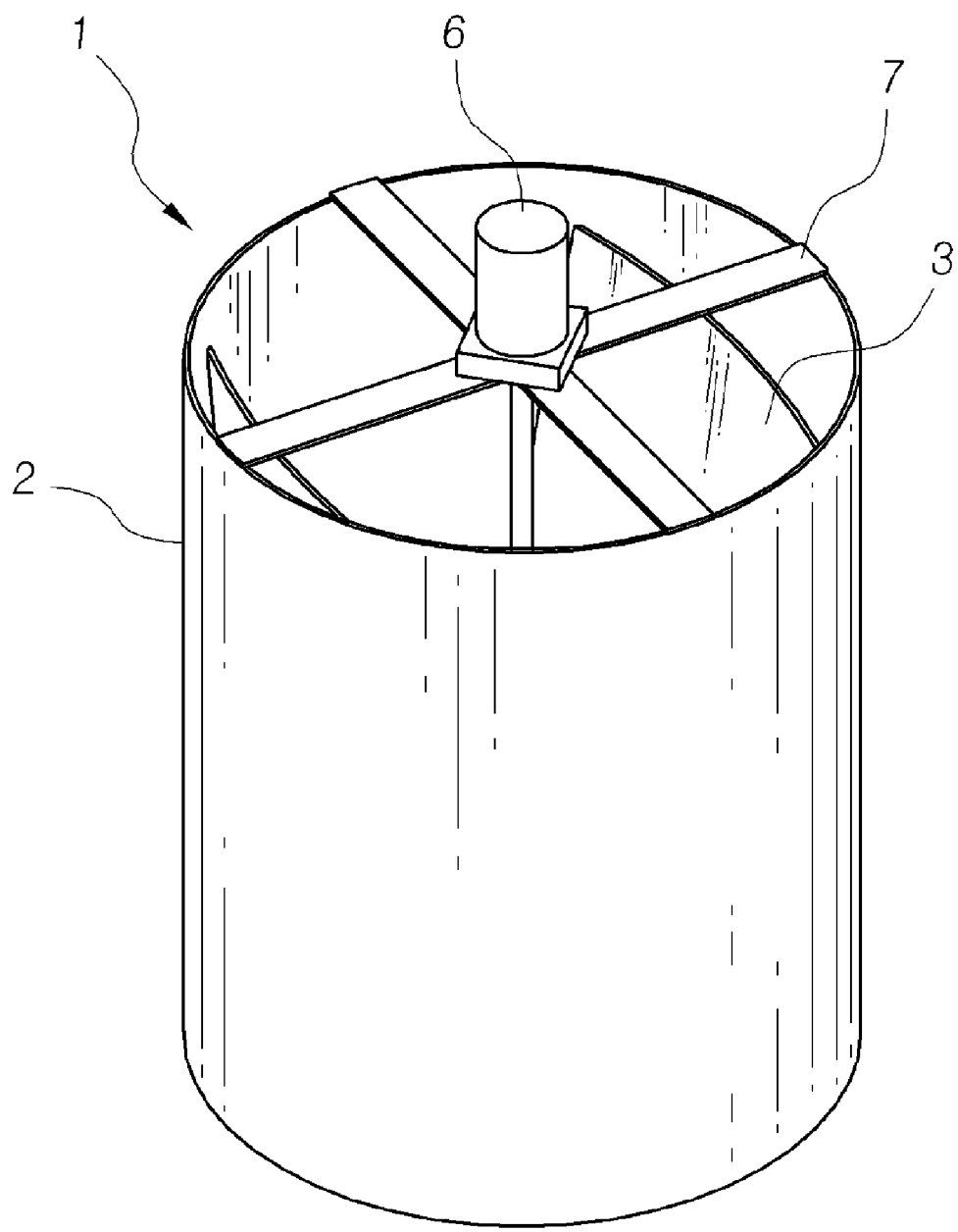
[Fig. 1]

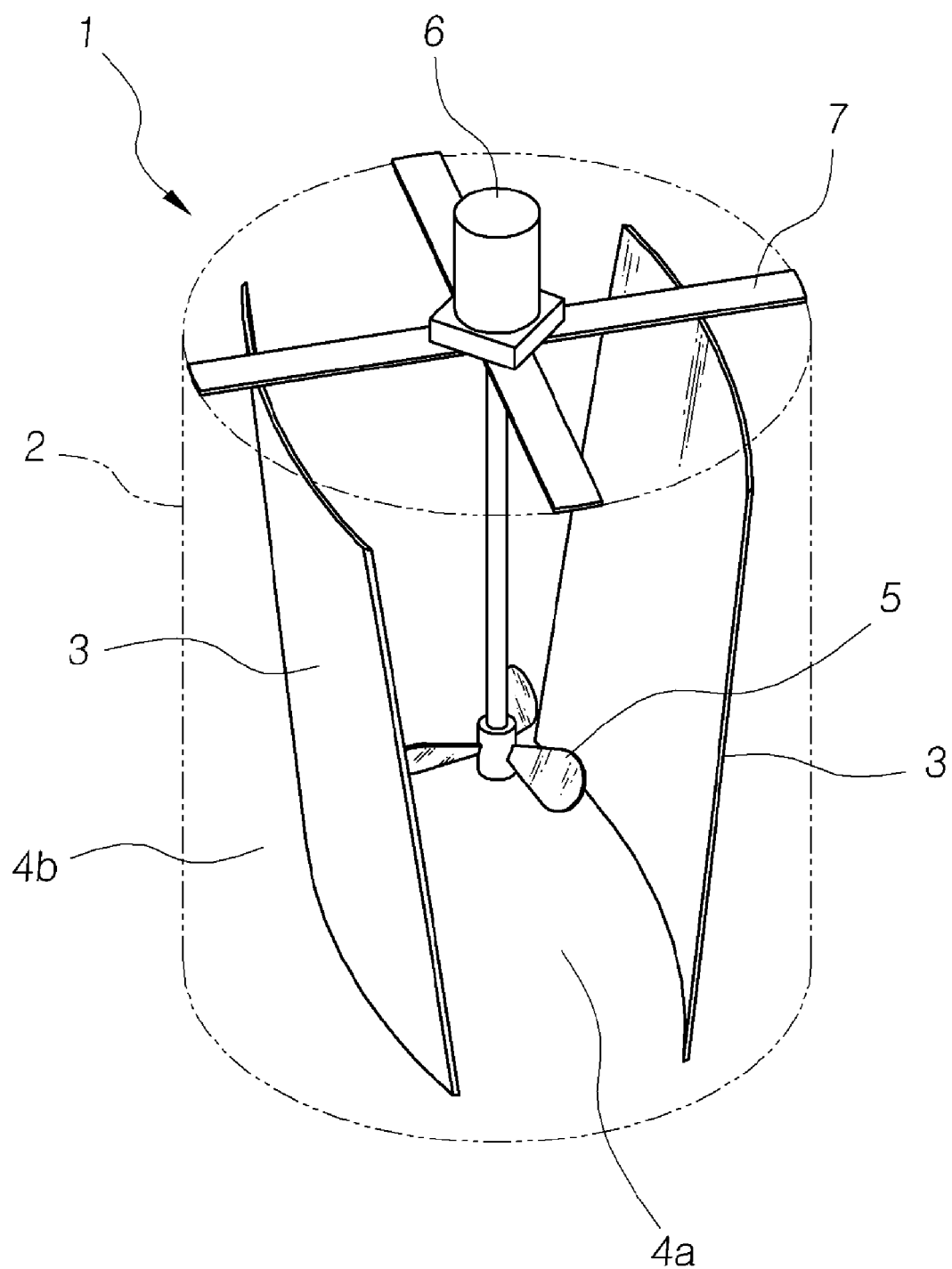
[Fig. 2]

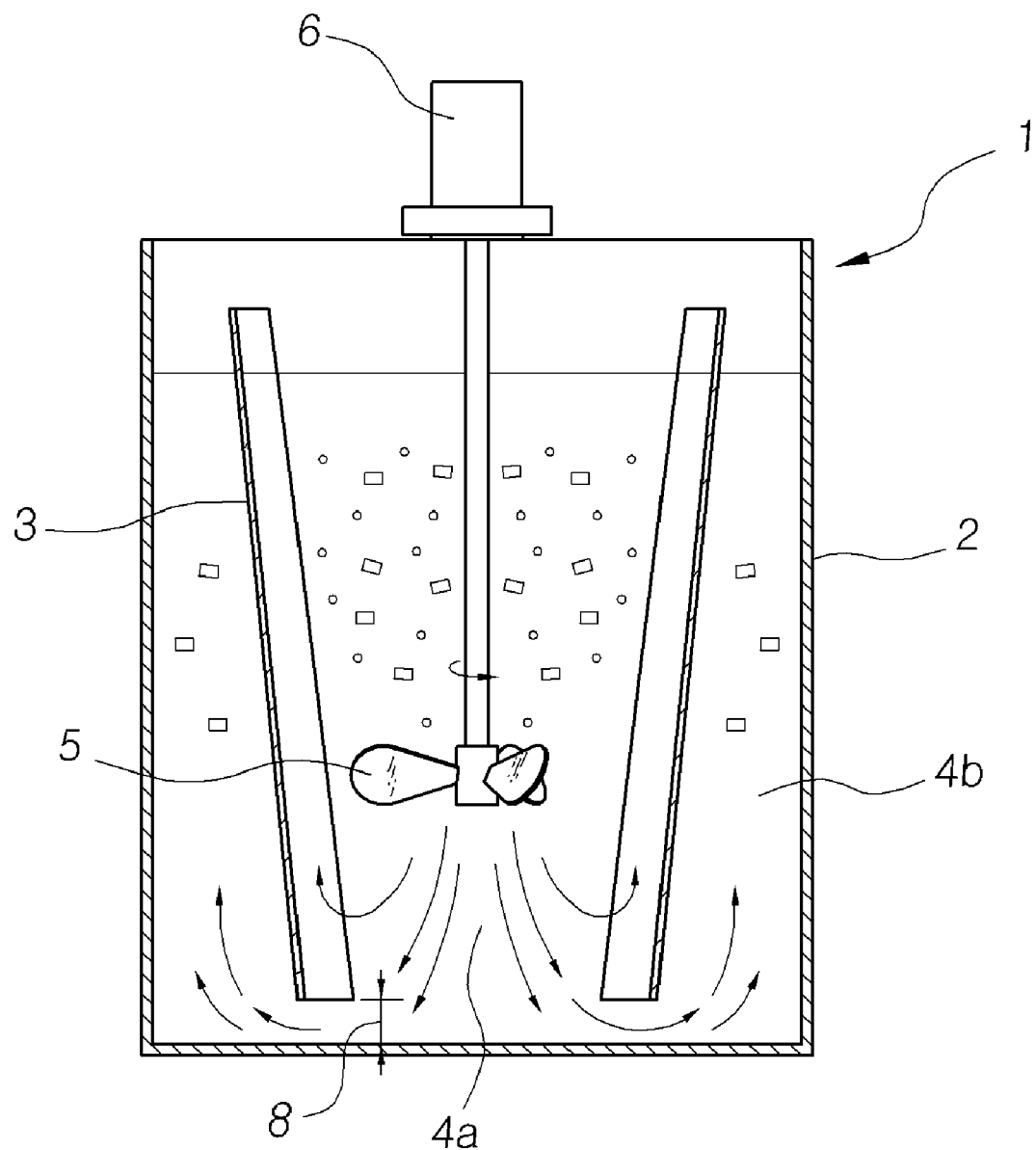
[Fig. 3]

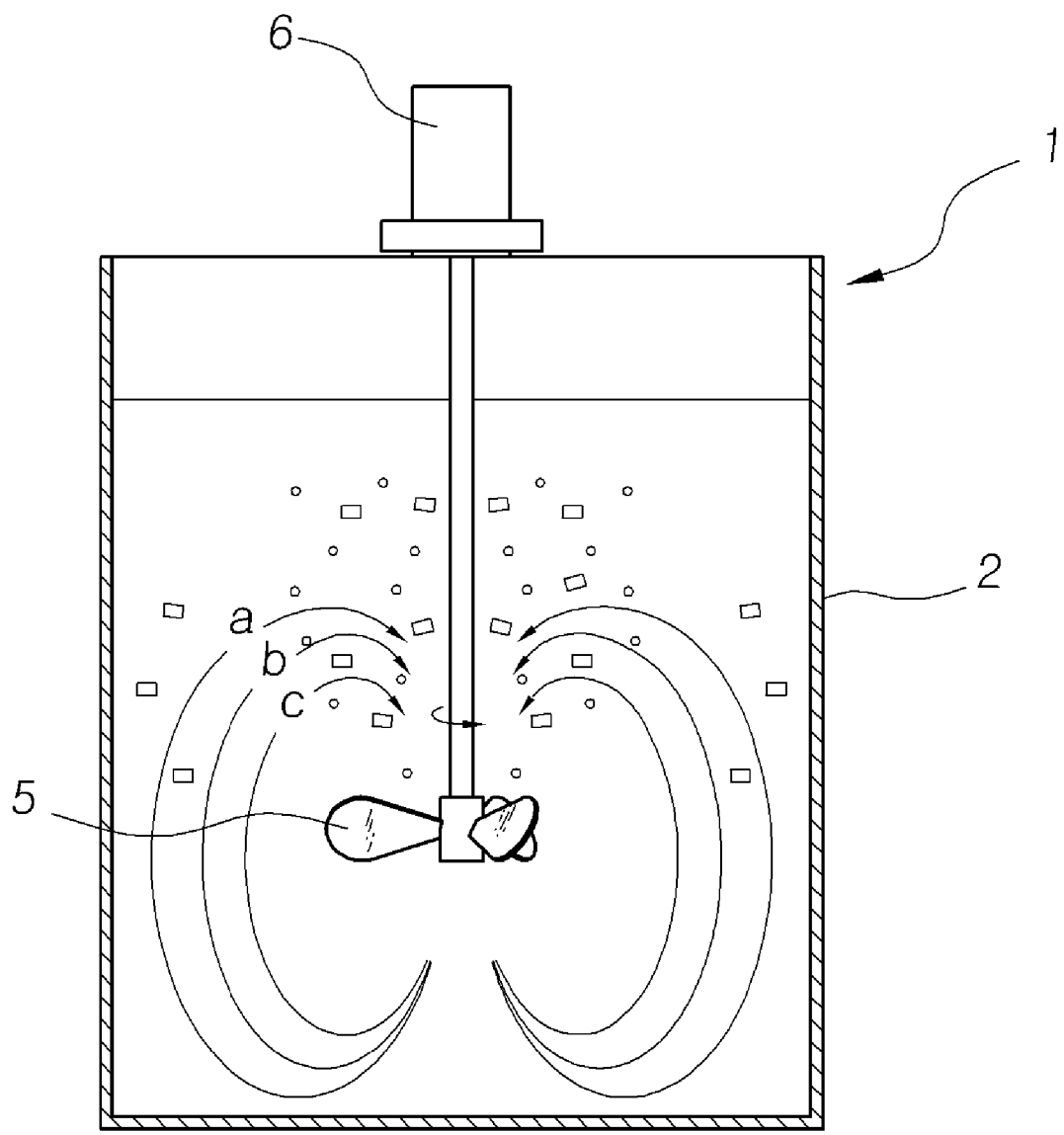
[Fig. 4]

REACTOR FOR SEPARATING ALUMINIUM FROM MULTI-LAYER FILM MATERIALS

TECHNICAL FIELD

The present invention relates to a reactor for separating aluminum from multi-layer film materials to reuse the multi-layer film materials by decomposing the multi-layer film materials, such as packing materials that consist essentially of polypropylene (PP), polyester (PET), polyethylene (PE) and an aluminum layer, and stamping foils that consist essentially of polyester (PET), pigment, binder and aluminum according to components thereof.

BACKGROUND ART

Recently, multi-layer film materials have been used for packing food stuffs for the purposes of moisture resistance, aesthetic appearance, etc. Such multi-layer film materials mainly include polypropylene, polyester and an aluminum layer, and additionally include polyethylene, etc. for the purpose of binding. The multi-layer film materials have been increasingly used for packing materials.

The multi-layer film materials are subject to multi-step bonding processes and a printing process such as a gravure printing process. However, defective goods may be produced during the bonding processes or the printing process, and the defective goods are wasted. In addition, a stamping foil, which is formed by attaching dye or pigment, binder, an aluminum layer and release agent to a polyester film, is used for transferring patterns and aesthetic colors to raw fabric. When the stamping foil has been used once, the stamping foil is disposed without being reused due to the remaining adhesive, dye or pigment, binder, aluminum layer and release agent. The disposed multi-layer film materials are partially reused without special treatments. However, since the multi-layer film materials contain various components mixed in predetermined ratios and have the aluminum layer, the multi-layer film materials represent poor physical properties. For this reason, the multi-layer film materials are merely reused in producing low-value products. In addition, most multi-layer film wastes and the stamping foils are disposed without reuse through incineration or burial methods, so that the environmental pollution problem caused by toxic substances created during incineration becomes serious.

DISCLOSURE OF INVENTION

Technical Problem

The present invention solves these problems known in the prior art. An object of the present invention is to provide a reactor for separating aluminum from multi-layer film wastes to reuse the multi-layer film wastes without burying or incinerating the multi-layer film wastes.

Technical Solution

In order to accomplish the above object, according to one aspect of the present invention, there is a reactor for separating aluminum from multi-layer film wastes, the reactor comprising a casing that is filled with a solution for dissolving an aluminum layer of the multi-layer film pulverized into a predetermined size, a partition that is installed in the casing and divides an inner portion of the casing into a reactor tub, which is installed at a center of the casing, and in which the solution is reacted with the aluminum, and at least one separator tub that is provided at a side portion of the reactor tub to decompose the multi-layer film materials in which aluminum is completely dissolved by means of the solution, and a stirrer that is installed at an upper portion of the reactor tub and stirs the solution in the reactor tub in order to transfer the solution and the multi-layer film materials, in which the aluminum layer is dissolved in the reactor tub, from the reactor tub to the separator tub, wherein the partition is spaced apart from a bottom of the casing by a predetermined distance to define a passage between the casing and the partition, and the reactor tub is interconnected with the separator tub through the passage.

The partition is installed at a side portion of the casing at a predetermined angle.

The partition has an arc trapezoidal shape having a radius curvature larger than that of the casing.

BRIEF DESCRIPTION OF THE DRAWINGS

FIG. 1 is a perspective view representing a reactor for separating aluminum from multi-layer film wastes according to the present invention;

FIG. 2 is a perspective view representing an inner portion of the reactor shown in FIG. 1;

FIG. 3 is a sectional view representing the reactor shown in FIGS. 1 and 2; and

FIG. 4 is a view representing a flow of solution by means of a stirrer when a partition is not installed.

REFERENCE NUMERALS IN DRAWINGS

1: reactor 2: casing
3: partition 4a: reactor tub
4b: separator tub 5: stirrer
6: motor 7: motor support
8: passage

BEST MODE FOR CARRYING OUT THE INVENTION

Hereinafter, a preferred embodiment of the present invention will be described in detail with reference to the accompanying drawings.

FIG. 1 is a perspective view representing a reactor for separating aluminum from multi-layer film wastes according to the present invention, FIG. 2 is a perspective view representing an inner portion of the reactor shown in FIG. 1, and FIG. 3 is a sectional view representing the reactor shown in FIGS. 1 and 2.

As shown in FIGS. 1 to 3, a reactor 1 includes a casing 2 having a cylindrical shape, at least one partition 3 which divides an inner space of the casing 2 to define a reactor tub 4a and at least one separator tub 4b, and a stirrer 5 which is provided in the reactor tub 4a of the casing 2 to stir solution in the reactor tub 4a. Since a lower end portion of the partition 3 is spaced apart from a bottom of the casing 2 by a predetermined distance, the reactor tub 4a communicates with the separator tub 4b through a passage 8 having a predetermined distance and being formed between the partition 3 and the bottom of the casing 2.

The casing 2 is filled with a proper amount of alkali aqueous solution, for example, NaOH aqueous solution, KOH aqueous solution, $Ca(OH)_2$ aqueous solution, and LiOH aqueous solution, or is filled with acid aqueous solution, for example, HCl aqueous solution, $H_2SO_4$ aqueous solution, $H_2NO_3$ aqueous solution, HF aqueous solution or HBr aqueous solution. Preferably, elements that make contact with the aqueous solution, such as the partition 3, the stirrer 5, and the casing 2, are made of materials such as Teflon, glass, and fiber reinforced plastic (FRP) that do not react with the solution, when the solution is an acid aqueous solution, and are made of materials such as stainless steel when the solution is an alkali aqueous solution.

Although not shown in the figures, a drainage and a valve can be connected with a bottom surface of the casing 2 to drain the solution.

In the present embodiment, although the casing 2 has a cylindrical shape, the scope of the present invention is not limited thereto. That is, the casing may have polygonal shapes, for example, a square shape, a pentagonal shape, a hexagonal shape and an octagonal shape. However, in view of efficiency, the casing 2 preferably has a cylindrical shape.

Meanwhile, although the bottom surface of the casing 2 is flat, the scope of the present invention is not limited thereto. For instance, the bottom surface of the casing 2 may have an inverse conical shape.

The partition 3 is an arcuate shape having a radius of curvature larger than that of the casing 2, and may have a trapezoidal shape having an upper portion narrower than a lower portion thereof. The partition 3 is installed on the casing 2, while forming an angle from about 45 degrees to about 85 degrees with respect to the bottom surface of the casing 2. In addition, the bottom end portion of the partition 3 is spaced apart from the bottom surface of the casing 2 by a predetermined distance so that the passage 8 described above is formed.

The partition 3 can be installed at both sides of the casing 2, which are symmetrical to each other, to form at least one separator tub 4b in the casing 2. In this case, the height of each of the passages 8 is set independently.

The stirrer 5 provided at the center of the reactor tub 4a includes a rotor blade driven by a motor 6 installed on a motor support 7 provided at the upper end portion of the casing 2. The rotor blade may have various shapes. Preferably, the rotor blade must have a shape that pushes the solution in the reactor tub 4a downward when the stirrer 5 is rotated by the motor 6. The stirrer 5 includes at least one rotor blade formed in various shapes according to the size of the reactor 1, etc.

FIG. 4 represents a flow state of the solution in the casing 2 according to a rotation of the stirrer 5 when the partition 3 is not installed in the casing 2. Since the specific gravity of the solution is constant in the reactor 1 when a plurality of solid particles having different specific gravities in the solution exist, the particles move according to the flows of (a), (b) and (c) as shown in FIG. 4 in the order of large specific gravities. This is because the solid particle having relatively large specific gravity is subject to a relatively small buoyancy of the solution.

When the partition 3 is installed on the casing 2 as shown in FIG. 3, the flow of the solution by the stirrer 5 is mainly formed in the reactor tub 4a defined by the partition 3. In the separator tub 4b formed at the outside of the partition 3, the solution existing at a lower portion of casing 2 slightly moves by the flow of the solution (a), but the solution existing at an upper portion of the solution rarely moves. Meanwhile, since the multi-layer films having a relatively small specific gravity are subject to a relatively large buoyancy of the solution, the multi-layer films move according to the flow (c) of the solution, and the multi-layer films having a relatively large specific gravity mainly move toward the separator tub 4b formed at the outside of the partition 3 according to the flow (a) of the solution. Since the solution in the separator tub 4b formed by the partition 3 rarely moves, the multi-layer films in the separator tub 4b move upwards or remain at a lower portion of the separator tub 4b according to their specific gravity.

The movement of the solution and the multi-layer films existing in the solution with various specific gravities in the reactor tub 4a and the separator tub 4b that are defined in the casing 2 by the partition 3 is not changed even if the number or the shape of the partition 3 is changed.

As described above, the aluminum layer of the multi-layer films that are input into the reactor tub 4a reacts with the caustic soda (NaOH) aqueous solution, so the aluminum layer dissolves in the solution while generating hydrogen ($H_2$). When all aluminum layers of the multi-layer films have been reacted with the aqueous solution, hydrogen is not generated. The hydrogen is generated in the solution in the form of bubbles at a portion of the aluminum layer, which reacts with the aqueous solution, and the size of the bubbles is gradually increased. The bubbles are separated from the aluminum layer when they have a predetermined size.

While the hydrogen gas bubbles are being attached to the aluminum layer, the specific gravity of the multilayer films is lower than that of the multilayer films to which the bubble is not attached. Accordingly, the multi-layer film chips having the aluminum layer have a specific gravity gradually decreased by generating hydrogen and reacting with alkali such as caustic soda in an appropriate condition, so that the multi-layer film chips move according to the inner flow (c) of the solution by the stirrer 5. While the aluminum is being dissolved through the reaction with the solution, the multi-layer film chips move along the inner flow of the solution, and when all the aluminum dissolves in the solution, the multi-layer film chips move to the separator tub 4b along the outer flow of the solution through the passage 8 below the partition 3.

In a state in which all aluminum layers are dissolved, the multi-layer films move upward by buoyancy when the multi-layer films have a specific gravity lower than that of the alkali solution.

In order to separate the aluminum layer from the waste-packing material by dissolution, the alkali solution has a specific gravity in a range of from about 1.0 to about 1.5, polypropylene and polyethylene have a specific gravity in a range of from about 0.9 to about 0.95, and polyester has a specific gravity of about 1.4. When the aluminum layer is dissolved through the reaction with the alkali aqueous solution, since the specific gravity of the multi-layer films, to which hydrogen bubbles are attached, varies according to the amount of the hydrogen air bubbles and the weight of the multi-layer films, the specific gravity cannot be precisely measured, but is assumed to be significantly lower than 0.9.

A batch type experiment was performed, in which the multi-layer film chips having an appropriate amount of aluminum layer are input into the reactor tub 4a of the casing 2, which is spaced apart from the bottom of the casing 2 by a predetermined height, in order to react the aluminum layer with the alkali solution while the rotor blade is being rotated at a predetermined speed. The packing material, which is prepared as a multi-layer structure mainly consisting of polyester (PET), polypropylene (PP), polyethylene(PE) and aluminum (Al), is pulverized into a size from 0.1 cm to 3 cm and then is input into the reactor tub 4a.

In the beginning of the reaction in which the aluminum layer of the multi-layer film starts to dissolve in the solution, all pulverized chips move along the inner flow of the solution, and do not move to the separator tub 4b defined by the partition 3. In the middle of the reaction, in which the aluminum layer in a portion of the multi-layer film chips is completely dissolved, the multi-layer film chips in which all aluminum layers are dissolved move to the separator tub 4b through the lower portion of the passage 8 along the outer flow of the solution so that the film having a specific gravity lower than that of the alkali solution floats upwards in the separator tub 4b and the film having a specific gravity higher than that the alkali solution gathers at the lower portion of the separator tub 4b.

Subsequently, the aluminum layers of the remaining multi-layer film chips are dissolved by a reaction with the solution in the reactor tub 4a and most multi-layer film chips move to the separator tub 4b through the lower portion passage 8 of the partition 3, and the multi-layer film chips rarely exist. As described above, the films which move to the upper portion of the separator tub 4b are collected by means of a scoop net, or are naturally collected by lowering the sidewall of the separator tub 4b with respect to the partition 3. In addition, the films which move to the lower portion of the separator tub 4b can be collected by means of a screw conveyor. As described above, the aluminum which dissolves in the alkali aqueous solution can be separated from the solution by an appropriate method, and the films, in which the aluminum is removed, are also separated so as to be used as a regenerated resource.

In addition, the partition 3 is formed in a cylindrical shape or a truncated conical shape, instead of the flat shape. Further, the rotation speed of the stirrer 5, the number and the position of the rotor blade, and the installed position of the partition 3 are determined according to the size of the reactor 1 and the amount of the multi-layer films from which the aluminum is separated.

INDUSTRIAL APPLICABILITY

As described above, according to the reactor for separating aluminum from the multi-layer film wastes of the present invention having the above structure, the multi-layer film wastes can be reused by dissolving the aluminum in the solution and then separating the aluminum from the solution without burying or incinerating the multi-layer film wastes.

The invention claimed is:

1. A reactor for separating aluminum from multi-layer film wastes, the reactor comprising:
    a casing filled with a solution for dissolving an aluminum layer of the multi-layer film materials pulverized into a predetermined size, the casing having a top, a bottom, and a center;
    one partition installed at one side of the casing, the partition having an arc shape and an upper end and a lower end, the upper end of the partition being positioned to extend above the solution filled in the casing, the partition dividing an inner portion of the casing into a reactor tub, which is installed at the center of the casing and in which the solution is reacted with the aluminum and in which the multi-layer film, wherein the aluminum layer has not completely being dissolved, can reside, and at least one separator tub that is provided at a side portion of the reactor tub to hold the multi-layer film materials in which the aluminum layer is completely dissolved by means of the solution; and
    a stirrer installed at an upper portion of the reactor tub for stirring the solution in the reactor tub in order to selectively transfer the multi-layer film materials, in which the aluminum layer is dissolved in the reactor tub, based on its difference in specific gravity, from the reactor tub to the separator tub;
    wherein the partition is angled toward the center between the top of the casing and the bottom of the casing such that the lower end of the partition is closer to the center than the upper end and the partition is spaced apart from a bottom of the casing by a predetermined distance to define a passage between the casing and the partition and the reactor tub is interconnected with the separator tub through the passage, and
    whereby the partition prevents the multi-layer film, selectively separated into the separator tub with the aluminum layer completely dissolved, from flowing into the reactor tub so that, due to the difference of specific gravity, the multi-layer films with aluminum remain in the reactor tub and the multi-layer films without aluminum remain in the separator tub; and
    whereby the arrangement of the partition in the casing induces a localized flow change of the multi-layer films for separation at the bottom of the casing.

2. The reactor as claimed in claim 1, wherein the partition is installed at a side portion of the casing while forming an angle of 45 degrees to 85 degrees with respect to a bottom surface of the casing.

3. The reactor as claimed in claim 1, wherein the partition has a trapezoidal shape having a radius of curvature larger than that of the casing.

4. The reactor as claimed in claim 1, wherein the one partition comprises two or more partitions.

5. A reactor for separating aluminum from multi-layer film wastes, the reactor comprising:
    a casing filled with a solution for dissolving an aluminum layer of the multi-layer film materials, the casing having a top, a bottom, and a center;
    at least two spaced apart partitions positioned in the casing, each of the partitions having an upper end and a lower end, the upper ends of the partitions extending above the upper level of the solution filled in the casing, the partitions dividing an inner portion of the casing into a reactor tub in the center of the casing and in which the solution is reacted with the aluminum and in which the multi-layer film, wherein the aluminum layer has not completely being dissolved, can reside, and separator tubs provided between the partitions and the casing to hold the multi-layer film materials in which the aluminum layer is completely dissolved by means of the solution, each of the partitions having an arc shape and being angled toward the center between the top of the casing and the bottom of the casing such that the lower end of each of the partitions is closer to the center than the upper end and the partitions are spaced apart from a bottom of the casing by a predetermined distance to define passages between the casing and the partitions and the reactor tub is interconnected with the separator tub through the passages, the partitions inducing a localized flow change of the multi-layer films for separation at the bottom of the casing; and
    a stirrer installed at an upper portion of the reactor tub for stirring the solution in the reactor tub in order to selectively transfer the multi-layer film materials, in which the aluminum layer is dissolved in the reactor tub, based on its difference in specific gravity, from the reactor tub to the separator tubs;
    wherein the partitions prevent the multi-layer film, selectively separated into the separator tubs with the aluminum layer completely dissolved, from flowing into the reactor tub over the upper end of the partition, and
    whereby, due to the difference of specific gravity the multi-layer films with aluminum remain in a reactor tub and the multi-layer films without aluminum remain in the separator tubs.

6. The reactor as claimed in claim 5, wherein the partitions are installed a side portions of the casing while forming an angle of 45 degrees to 85 degrees with respect to a bottom surface of the casing.

7. The reactor as claimed in claim 5, wherein each of the partitions has a trapezoidal shape having a radius of curvature larger than that of the casing.

* * * * *